United States Patent
Crasmariu et al.

(10) Patent No.: US 10,110,287 B1
(45) Date of Patent: Oct. 23, 2018

(54) TRANSMITTER PRECODING BASED ON QUALITY SCORE

(71) Applicant: Freescale Semiconductor, Inc., Austin, TX (US)

(72) Inventors: Victor-Florin Crasmariu, Bucharest (RO); Marius Octavian Arvinte, Focsani (RO); Andrei Alexandru Enescu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/688,029

(22) Filed: Aug. 28, 2017

(30) Foreign Application Priority Data

Jun. 9, 2017 (RO) ................................ A201700356

(51) Int. Cl.
- *H04B 7/06* (2006.01)
- *H04B 7/0456* (2017.01)
- *H04L 25/02* (2006.01)
- *H04B 7/0452* (2017.01)

(52) U.S. Cl.
CPC ......... *H04B 7/0456* (2013.01); *H04B 7/0452* (2013.01); *H04B 7/06* (2013.01); *H04L 25/0202* (2013.01)

(58) Field of Classification Search
CPC .. H04B 7/0456; H04B 7/0615; H04B 7/0617; H04L 25/03343; H04L 2025/03426
USPC .................................. 375/267, 260, 295, 296
See application file for complete search history.

(56) References Cited

U.S. PATENT DOCUMENTS

| | | | |
|---|---|---|---|
| 9,094,990 B2 | 7/2015 | Morozov | |
| 9,300,379 B2 | 3/2016 | Jongren | |
| 2008/0112500 A1* | 5/2008 | Pan | H04B 7/0417 375/267 |
| 2011/0274002 A1 | 11/2011 | Pare, Jr. | |

OTHER PUBLICATIONS

Sada, et al., "A Generalized Approach to Block Diagonalization for Multiuser MIMO Downlink," IEEE 21 st International Symposium on Personal Indoor and Mobile Radio Communications, 2010, 6 pages.
Nishimoto, et al., "Imperfect Block Diagonalization for Multiuser MIMO Downlink," IEEE 19th International Symposium on Personal, Indoor and Mobile Radio Communications, 2008, 5 pages.

* cited by examiner

*Primary Examiner* — Kevin Kim (57) ABSTRACT

A transmitter generates precoding matrices for communication channels of a transmitter, The transmitter includes a plurality of user-specific channels, with each user specific channel associated with a different set of user equipment (UE) receive antennas. For precoding, the transmitter generates a baseline channel matrix reflecting the characteristics of the communication medium employed to transmit data to the different user equipment (UEs). For each user-specific channel, the transmitter generates a set of null space vectors wherein only a subset of the generated null space vectors generated by the transmitter are used to precode the data. To identify the combination of null space vectors to be used for each channel, the transmitter calculates a quality score for each such combination of null space vectors. The transmitter uses the subset of null vectors that yields the highest score to precode the data.

20 Claims, 4 Drawing Sheets

TRANSMITTER PRECODING BASED ON QUALITY SCORE

BACKGROUND

Field of the Disclosure

The present disclosure relates generally to data communication and more particularly relates to data transmitters.

Description of the Related Art

Communication networks typically employ transmitters to communicate information to endpoints of the network. For example, cellular networks employ base stations to communicate data from the network infrastructure to user equipment (e.g., mobile handsets). To facilitate more reliable and efficient communication, the base stations sometimes use multiple-input multiple-output (MIMO) transmitters to take advantage of communication features such as spatial diversity. The multi-user MIMO (MU-MIMO) transmitter includes multiple communication channels, with each channel transmitting data to a corresponding user equipment. To reduce the communication overhead at the user equipment, the MIMO transmitter typically precodes data prior to transmission via a communication channel. In particular, precoding can adjust the data to be transmitted in order to account for interference from data being concurrently communicated via other channels of the MIMO transmitter. However, conventional precoding typically demands generation of multiple null space vectors for each communication channel, and selection of a subset of the null vectors to form a precoding matrix for application to the data to be transmitted. To select the subset of null space vectors, the MIMO transmitter transmits a set of test signals, each test signal based on a different null space vector, and selects the null space vectors corresponding to the best performance. However, the number of null space vectors to be tested is typically large, requiring a corresponding large number of test signals and therefore negatively impacting the processing efficiency and power consumption of the MU-MIMO transmitter.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for generating precoding matrices for communication channels of a transmitter, such as a MU-MIMO transmitter of a cellular communications network or a wireless network router. The transmitter includes a plurality of user-specific channels, with each user specific channel associated with a different set of user equipment (UE) receive antennas. For precoding, the transmitter generates a baseline channel matrix reflecting the characteristics of the communication medium employed to transmit data to the different user equipment. For each user-specific channel, the transmitter generates a set of null space vectors. However, only a subset of the null space vectors generated by the transmitter are used to precode the data. To identify the combination of null space vectors to be used for each channel, the transmitter calculates a quality score for each such combination of null space vectors. The transmitter uses the subset of null vectors that yields the highest score to precode the data. In particular, the transmitter forms a precoding matrix based on the selected null space vectors and applies the precoding matrix to the data symbols to be transmitted, thereby precoding the data.

In at least one embodiment, the transmitter calculates the quality scores for each combination of null space vectors in an a priori manner—that is based on data predefined or stored at the base station, and not based on transmitting dedicated test signals to identify the best preforming null space vectors. For example, in at least one embodiment the quality scores are calculated based on portions of the channel matrix. Thus, as explained further herein, the transmitter generates the precoding matrix based on calculated quality scores, rather than based on dedicated test signals, thereby reducing power consumption and improving processing efficiency at the transmitter.

Figure 1:
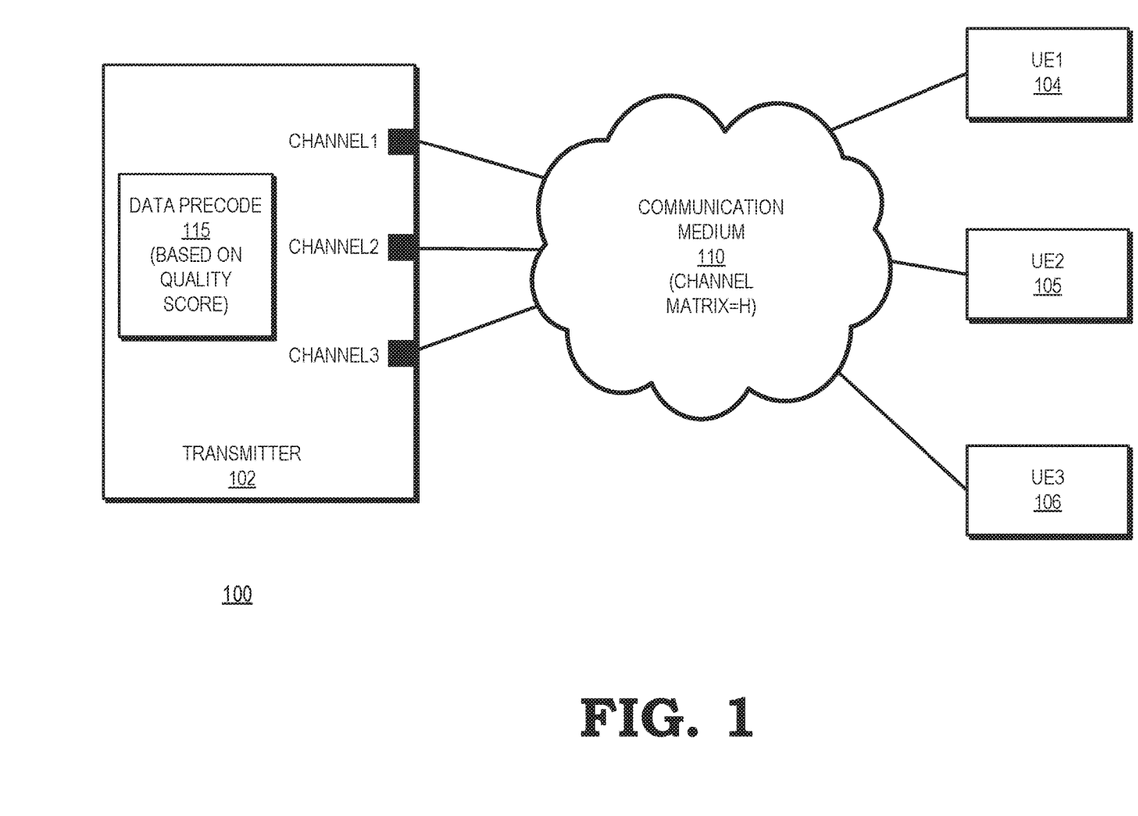
FIG. 1 is a block diagram of a communication network that employs a transmitter configured to identify null space vectors for precoding based on calculated quality scores in accordance with at least one embodiment.

FIG. 1 illustrates a block diagram of a portion of a communications network 100 including a transmitter 102, user equipment (UEs) 104, 105, and 106, and a communication medium 110. For purposes of description, it is assumed that the communications network 100 is a telecommunications network, such as a Long-Term Evolution (LTE) wireless communication network or a WiFi network that complies with an 802.11xx network standard. It is further assumed that the transmitter 102 is a multi-user multiple-input multiple output (MU MIMO) transmitter incorporated in or co-located with a base station, such as an Evolved Node B (eNodeB) of an LTE network, and that the UEs 104-106 are each mobile handsets, such as compute-enabled mobile phones. In other embodiments, the transmitter 102 is incorporated or co-located with a wireless router device. However, it will be appreciated that the techniques described herein can apply to different types of transmitters, different types of networks, and different types of user equipment, as well as different combinations thereof. Moreover, it is assumed that the communication medium 110 is a communication medium that physically transfers of signals between the transmitter 102 and the UEs 104-106, such as air, but that the techniques described herein can apply to different types of communication media.

As indicated above, the transmitter 102 is a MU MIMO transmitter generally configured to receive data from another portion (not shown) of the network, the data representing information individually targeted to different ones of the UEs 104-106. The transmitter 102 negotiates with each of the UEs 104 to 106 to establish user-specific communication channels (referred to herein as channels) with each UE, and communicates data to each of the UEs 104-106 over the corresponding channel and via the communication medium 110. Thus, in the illustrated example, the transmitter 102 establishes three communication channels, designated CHANNEL1, CHANNEL2, and CHANNEL3, to communicate data to UE 104, UE 105, and UE 106, respectively. In at least one embodiment, each channel includes, at least in part, corresponding physical equipment to facilitate the communication of data to its corresponding UE. For example, the transmitter 102 includes a plurality of antennas (not shown at FIG. 1) to send data over the communication medium 110, with each channel including multiple ones of the plurality of antennas. For example, in at least one embodiment each channel includes at least two antennas to communicate data, thereby supporting more reliable communication with the UEs 104-106.

In at least one embodiment, the transmitter 102 is configured to communicate data via the channels concurrently. This concurrent transmission of data via different channels can cause cross-channel interference, reducing the reliability of the communicated data. Further, reduction of the cross-channel interference is based on the state of each communication channel. Therefore, it is difficult to reduce such cross-channel interference at the UEs 104-106 themselves, as each individual UE is not aware of the state of the communication channels corresponding to the other UEs. Accordingly, to reduce cross-channel interference, the transmitter 102 includes a data precode module 115 generally configured to precode the received data for transmission. In particular, the data precode module is configured to adjust the data to be transmitted to account for how the data is likely to be affected by cross channel interference, as well as other characteristics of the communication medium 110.

To illustrate, the data precode module 115 is generally configured to determine a baseline channel matrix, designated channel matrix H, for the communication medium 110. The channel matrix H reflects characteristics of the communication medium 110, including characteristics resulting from cross-channel interference, and in particular the effect of the communication medium 110 on transmitted signals. The data received at the UEs 104-106 is given by the following formula:

$$r = H * s + n$$

where r is the matrix of received data, H is the channel matrix, s is the vector of data symbols being transmitted over the antennas of the transmitter 102, and n represents a vector containing noise samples associated with the communication medium 110. The H matrix is an $n_r$ by $n_t$ matrix, where $n_t$ is the number of transmit antennas at the transmitter 102, and $n_r$ is the total number of receive antennas across the UEs. Thus, in the depicted example of FIG. 1, if each of the UEs 104, 105, and 106 has two receive antennas, then $n_r$ is six.

In at least one embodiment, the data precode module 115 determines the channel matrix H by sending one or more test signals to the UEs 104-106 via each of the communication channels, receiving responsive test information from each of the UEs 104-106, and generating the channel matrix H based on the responsive test information using one or more conventional techniques. In at least one other embodiment, the data precode module 115 estimates the channel matrix H based on stored characteristics of the communication medium. In still another embodiment, the data precode module 115 generates the channel matrix H based on a combination of stored characteristics and test results from transmission of one or more test signals.

To precode the data for transmission, the data precode module 115 generates a precoding matrix P. The precoding operation can therefore be expressed by the following formula:

$$s = Px$$

where x is the data to be transmitted as provided to the transmitter 102. In at least one embodiment, x is a column vector having $n_l$ elements, where $n_l$ is the number of layers that can be simultaneously transmitted by the transmitter 102. The precoding matrix P is a $n_t$ by $n_l$ matrix.

In at least one embodiment, the transmitter 102 generates the matrix P according to a block diagonalization technique, and the matrix P is therefore designated $P_{BD}$. The transmitter forms matrix $P_{BD}$ such that, when the channel matrix H is multiplied by the matrix $P_{BD}$, the elements of the resulting matrix $H_e$ outside the main diagonal are set to zero, as illustrated by the following example. In this example, the matrix H is as follows:

$$H = \begin{bmatrix} h_{11}^{UE1} & h_{12}^{UE1} & h_{13}^{UE1} & h_{14}^{UE1} & h_{15}^{UE1} & h_{16}^{UE1} & h_{17}^{UE1} & h_{18}^{UE1} \\ h_{21}^{UE1} & h_{22}^{UE1} & h_{23}^{UE1} & h_{24}^{UE1} & h_{25}^{UE1} & h_{26}^{UE1} & h_{27}^{UE1} & h_{28}^{UE1} \\ h_{31}^{UE2} & h_{32}^{UE2} & h_{33}^{UE2} & h_{34}^{UE2} & h_{35}^{UE2} & h_{36}^{UE2} & h_{37}^{UE2} & h_{38}^{UE2} \\ h_{41}^{UE2} & h_{42}^{UE2} & h_{43}^{UE2} & h_{44}^{UE2} & h_{45}^{UE2} & h_{46}^{UE2} & h_{47}^{UE2} & h_{48}^{UE2} \\ h_{51}^{UE3} & h_{52}^{UE3} & h_{53}^{UE3} & h_{54}^{UE3} & h_{55}^{UE3} & h_{56}^{UE3} & h_{57}^{UE3} & h_{58}^{UE3} \\ h_{61}^{UE3} & h_{62}^{UE3} & h_{63}^{UE3} & h_{64}^{UE3} & h_{65}^{UE3} & h_{66}^{UE3} & h_{67}^{UE3} & h_{68}^{UE3} \end{bmatrix}$$

where each element of H is denoted as $h_{ij}^{UEk}$, and models the propagation effect between j-th transmit antenna and i-th receive antenna of the the k-th channel. The matrix $P_{BD}$ is selected by the transmitter 102 such that the following formula is satisfied:

$$H_e = HP_{BD} = \begin{bmatrix} h_{(e)11}^{UE1} & h_{(e)12}^{UE1} & 0 & 0 & 0 & 0 \\ h_{(e)21}^{UE1} & h_{(e)22}^{UE1} & 0 & 0 & 0 & 0 \\ 0 & 0 & h_{(e)33}^{UE2} & h_{(e)34}^{UE2} & 0 & 0 \\ 0 & 0 & h_{(e)43}^{UE2} & h_{(e)44}^{UE2} & 0 & 0 \\ 0 & 0 & 0 & 0 & h_{(e)55}^{UE3} & h_{(e)56}^{UE3} \\ 0 & 0 & 0 & 0 & h_{(e)65}^{UE3} & h_{(e)66}^{UE3} \end{bmatrix} = \begin{bmatrix} H_{e,1} & 0 & 0 \\ 0 & H_{e,2} & 0 \\ 0 & 0 & H_{e,3} \end{bmatrix}$$

where $H_{e,i}$ denotes the equivalent single-user channel for the i-th user. To form the matrix $P_{BD}$, the transmitter 102 searches for a set of precoding vectors for each UE that forces zeros in the $H_e$ matrix in the positions that cause interference. The number of vectors needed for each UE is equal to the number of layers transmitted to the UE by the transmitter 102. The transmitter 102 forms the matrix $P_{BD}$ by concatenating the column vector sets found for each user, as set forth by the following expression:

$$P_{BD} = [P_1 P_2 P_3 \ldots P_K]$$

Where $P_i$ represents the precoding vector set identified for the i-th UE.

To identify the precoding vector set for each UE, the transmitter 102 includes a data precode module 115 that identifies the vector sets based on correspond quality scores. In particular, for each UE the data precode module 115 chooses vectors from the columns of the null space of a user associated channel complementary matrix, denoted as $\tilde{H}_i$. $\tilde{H}_i$ is obtained by eliminating the rows out of the H matrix that correspond to the selected user receive antennas. $\tilde{V}_i$ denotes the null-space of $\tilde{H}_i$ matrix, which consists of $n_{NS,i}$ column vectors, as set forth in the following expression:

$$\tilde{V}_i = [v_1 v_2 v_3 \ldots v_{n_{NS,i}}])$$

The matrix $\tilde{V}_i$ can be calculated using any of a variety of conventional null space calculation techniques, including using the elements of the $\tilde{H}_i$ matrix as the coefficients of a system of linear equations, with each of the equations set equal to zero, then solving the system of linear equations. Under uncorrelated MIMO channel conditions (i.e. the rows within H matrix are linearly independent one to each other), $n_{NS,i}$ is:

$$n_{NS,i} = n_t - n_r + n_{r,i}$$

In the case of asymmetrical MIMO systems, $n_{NS,i}$ is larger than the number of vectors required to precode the data for i-th user.

The data precode module 115 identifies a set of potential precode vector combinations for each UE, and calculates a quality score for each combination set. The data precode module 115 then identifies, for each UE, the combination set having the highest quality score as the precoding vector for that UE. That is, the data precode module designates the combination set having highest quality score for the i-th UE as $P_i$.

In at least one embodiment, the data precode module 115 identifies the combination sets and calculates the quality score as follows. the number of $P_i$ matrices that can be formed for the i-th UE, in the case that $n_t > n_r$, is:

$$n_{combs,i} = C_{n_{NS,i}}^{n_{r,i}}$$

The data precode module 115 forms matrices Pi,j for the i-th UE by selecting the j-th vectors combination from the $\tilde{V}_i$ matrix (with $j \leq n_{combs,i}$).

The data precode module 115 further identifies, for the i-th UE, a matrix $\tilde{H}_i'$ from the whole system channel matrix, H. Compared to $\tilde{H}_i$, $\tilde{H}_i'$ only keeps the rows from the H matrix that correspond to the i-th user's receive antennas (the matrix $\tilde{H}_i'$ is therefore complementary to the $\tilde{H}_i$ matrix with respect to H).

For each $P_{i,j}$, the data precode module 115 derives a corresponding UE-specific inter-UE interference free equivalent channel according to the following equation:

$$H_{e,ij} = \tilde{H}_i' O_{i,j}$$

In at least one embodiment, in order to eliminate the need to calculate $\tilde{H}_i' P_{i,j}$ for each j, a the data precode module calculates the following matrix once per each UE:

$$H_{e,i}' = \tilde{H}_i' \tilde{V}_i$$

The data precode module obtains $H_{e,ij}$ by selecting the column vectors out of the $H_{e,i}'$ matrix in the same way $P_{i,j}$ is obtained from the $\tilde{V}_i$ matrix.

For each candidate precoding matrix $P_{i,j}$, the data precode module 115 identifies a quality score. In at least one embodiment, the quality score is calculated according to the following formula:

$$M_{ij} = det(H_{e,ij}^H H_{e,ij})$$

where $H_{e,ij}^H$ is the Hermetian form of the matrix $H_{e,ij}$ and is generated by the data precode module by transposing and complex conjugating the matrix $H_{e,ij}^H$. By calculating the quality score $M_{ij}$ based on a determinant (det), the data precode module can generate the quality score using relatively few calculations, thereby conserving resources of the transmitter 102, such as power.

For the i-th UE, the data precode module 115 selects the column vector $P_{ij}$ corresponding to the highest quality score $M_{ij}$. After selecting a vector for each UE 104-106, the data precode module 115 concatenates the selected vectors to form the matrix $P_{BD}$. The transmitter 102 precodes the data symbols to be transmitted by multiplying the data symbols and the matrix $P_{BD}$ as explained above, and then transmits the precoded data symbols to the corresponding UEs 104-106. By forming the matrix $P_{BD}$ based on a quality score, rather than on the transmission of test signals, the transmitter 102 can precode the data to be transmitted using fewer system resources, thereby conserving power.

Figure 2:
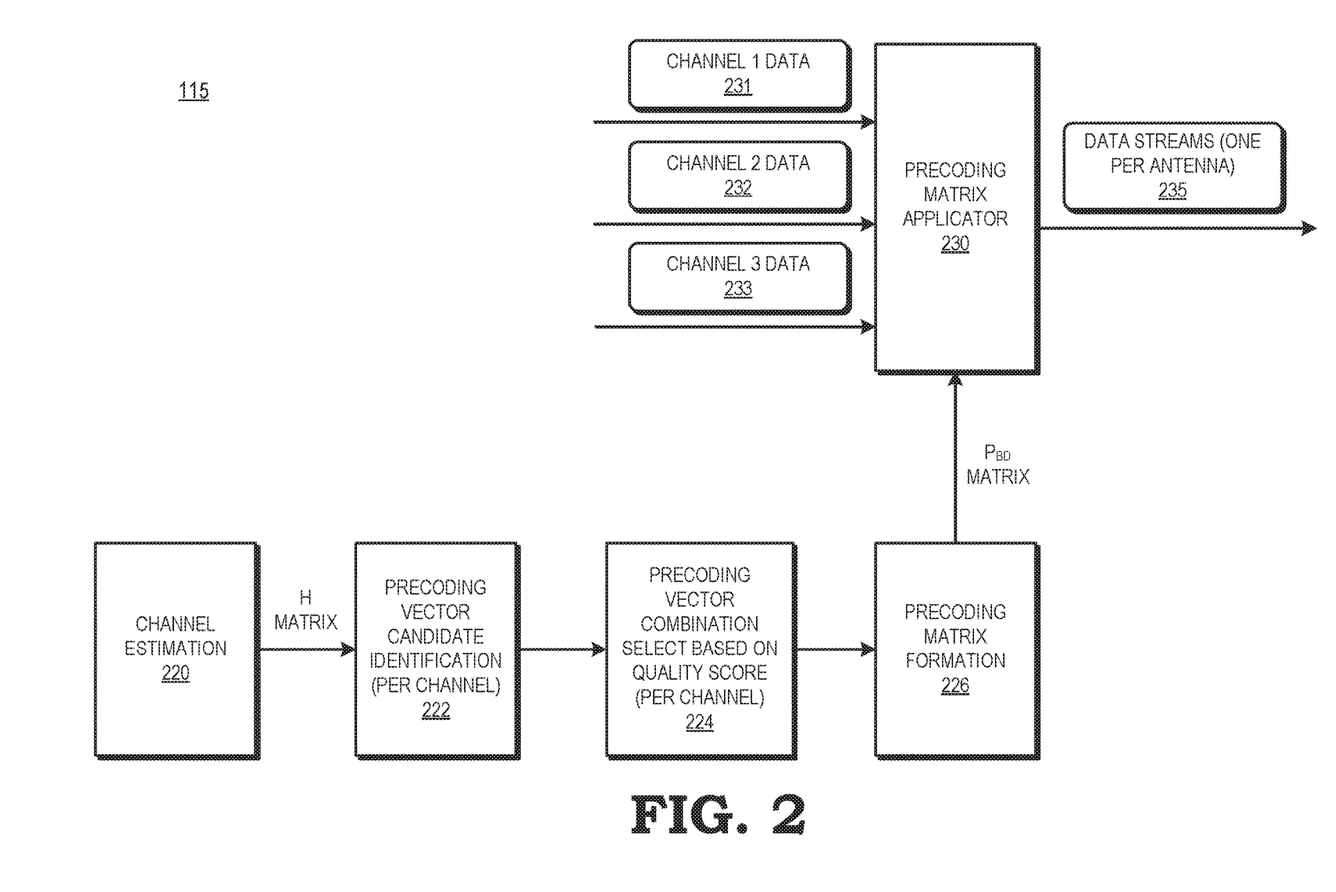
FIG. 2 is a block diagram of the data precode module of the transmitter of FIG. 1 in accordance with at least one embodiment.

FIG. 2 illustrates a block diagram of the data precode module 115 in accordance with at least one embodiment. In at least one embodiment, the data precode module 115 is a hardware module including logic circuits arranged and connected to perform the operations described further herein. In another embodiment, one or more operations of the data precode module 115 are performed by software manipulating a processor to execute the operations. In the depicted example, the data precode module 115 includes a channel estimation module 220, a precoding vector candidate identification module 222, a precoding vector select module 224, a precoding matrix formation module 226, and a precoding matrix applicator module 230. The channel estimation module 220 is generally configured to generate the channel matrix H for the transmitter 102. In at least one embodiment, the channel estimation module 220 determines the channel matrix H by sending one or more test signals to the UEs 104-106 via each of the communication channels, receiving responsive test information from each of the UEs 104-106, and generating the channel matrix H based on the responsive test information using one or more conventional techniques. In at least one other embodiment, the channel estimation module 220 estimates the channel matrix H based on stored characteristics of the communication medium. In still another embodiment, the channel estimation module 220 generates the channel matrix H based on a combination of stored characteristics and test results from transmission of one or more test signals.

The precoding vector candidate identification module 222 identifies a set of candidate precoding vectors for each channel of the transmitter 102. In at least one embodiments, the precoding vector candidate identification module 222 identifies matrices $P_{i,j}$ for the i-th UE by selecting the j-th vectors combination from the $\tilde{V}_i$ matrix as described above with respect to FIG. 1. The precoding vector candidate identification module 222 further identifies, for the i-th UE, a matrix $\tilde{H}_i'$ from the whole system channel matrix, H. Compared to $\tilde{H}_i$, $\tilde{H}_i'$ only keeps the rows from the H matrix that correspond to the i-th user's receive antennas. For each $P_{i,j}$, the data precode module 115 derives a corresponding UE-specific inter-UE interference free equivalent channel as explained above:

The precoding vector select module 224 identifies, for each candidate precoding matrix $P_{i,j}$, a corresponding quality score $M_{ij}$. In at least one embodiment, the quality score is calculated based on the determinant of the matrix $H_{e,ij}$ multiplied by the Hermetian form of the matrix $H_{e,ij}$, as explained above with respect to FIG. 1. The precoding vector select module 224 selects, for each channel the candidate precoding matrix having the highest quality score. The precoding matrix formation module 226 receives the selected candidate precoding matrices from the precoding vector select module 224, and concatenates the received matrices to form the precoding matrix $P_{BD}$. In at least one embodiment, each of the selected matrices forms a corresponding column of the precoding matrix $P_{BD}$. For example, in one embodiment, the precoding vector select module 226 forms the matrix $P_{BD}$ such that the first column of the matrix is equal to the selected candidate precoding matrix for the first channel of the transmitter 102, the second column of the matrix is equal to the selected candidate precoding matrix for the second channel of the transmitter 102, and so on until all of the selected candidate precoding matrices have been used.

The precoding matrix applicator 230 receives the precoding matrix $P_{BD}$ to data symbols received for each channel of the transmitter 102. In particular, the precoding matrix applicator 203 receives data symbols for each of its communication channels, designated Channel 1 data 231, Channel 2 data 232 and Channel 3 data 233. The precoding matrix applicator 230 concatenates the received data symbols into the matrix x, then multiplies the matrix x by the matrix $P_{BD}$ to generate the matrix s, representing the precoded data to be transmitted. The precoding matrix applicator 230 then separates the matrix s into individual spatial data streams (collectively designated data streams 235) to be transmitted via the antennas of the transmitter 102.

Figure 3:
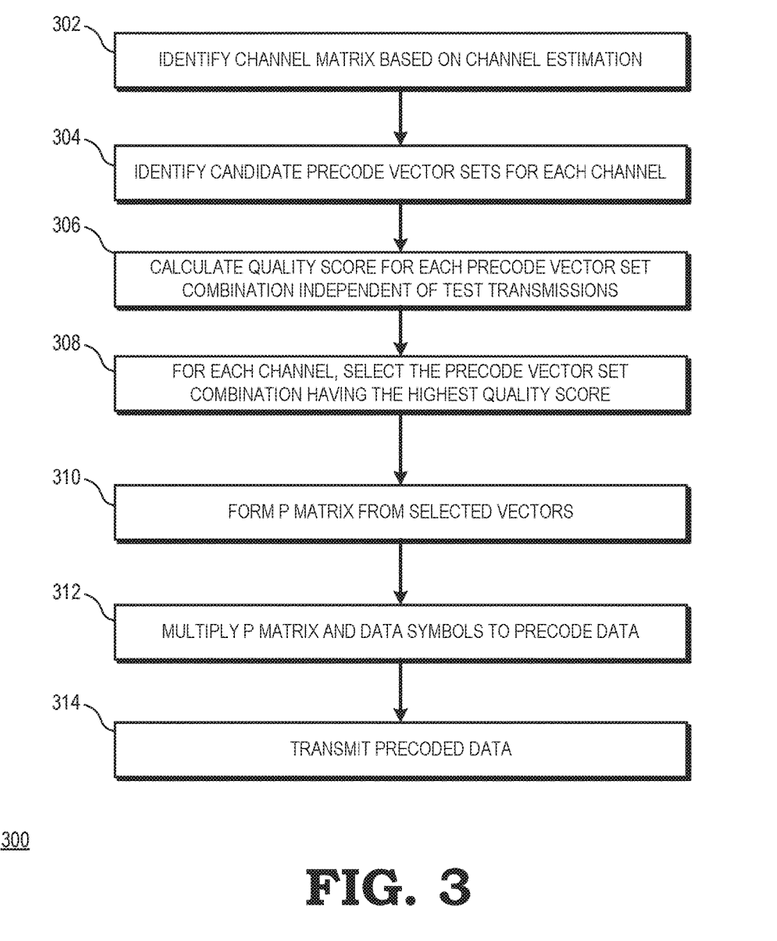
FIG. 3 is a flow diagram of a method of identifying null space vectors for precoding based on calculated quality scores in accordance with at least one embodiment.

FIG. 3 illustrates a flow diagram of a method 300 of precoding data based on quality scores for candidate precoding matrices in accordance with at least one embodiment. For purposes of description, the method 300 is described with respect to an example implementation at the transmitter 102 of FIG. 1 and the data precode module 115 of FIG. 2. At block 302 the channel estimation module 220 identifies the H matrix as described above. At block 304 the precoding vector candidate identification module 222 identifies a set of candidate precoding vectors for each channel of the transmitter 102. In at least one embodiments, the precoding vector candidate identification module 222 identifies matrices $P_{i,j}$ for the i-th UE by selecting the j-th vectors combination from the $\tilde{V}_i$ matrix and further identifies, for the i-th UE, a matrix $\tilde{H}_i'$ from the whole system channel matrix, H. For each $P_{i,j}$, the precoding vector candidate identification module 222 derives a corresponding UE-specific inter-UE interference free equivalent channel as explained above:

At block 306, the precoding vector select module 224 calculates, for each candidate precoding matrix $P_{i,j}$, a corresponding quality score $M_{ij}$. At block 308, the precoding vector select module 224 selects, for each channel the candidate precoding matrix having the highest quality score. At block 310, the precoding matrix formation module 226 receives the selected candidate precoding matrices from the precoding vector select module 224, and concatenates the received matrices to form the precoding matrix $P_{BD}$. At block 312, the precoding matrix applicator 230 receives the precoding matrix data symbols received for each channel of the transmitter 102 and multiplies the data symbols by the matrix $P_{BD}$ to generate the matrix s, representing the precoded data to be transmitted. At block 314, the transmitter 102 transmits the precoded data symbols to the UEs 104-106.

Figure 4:
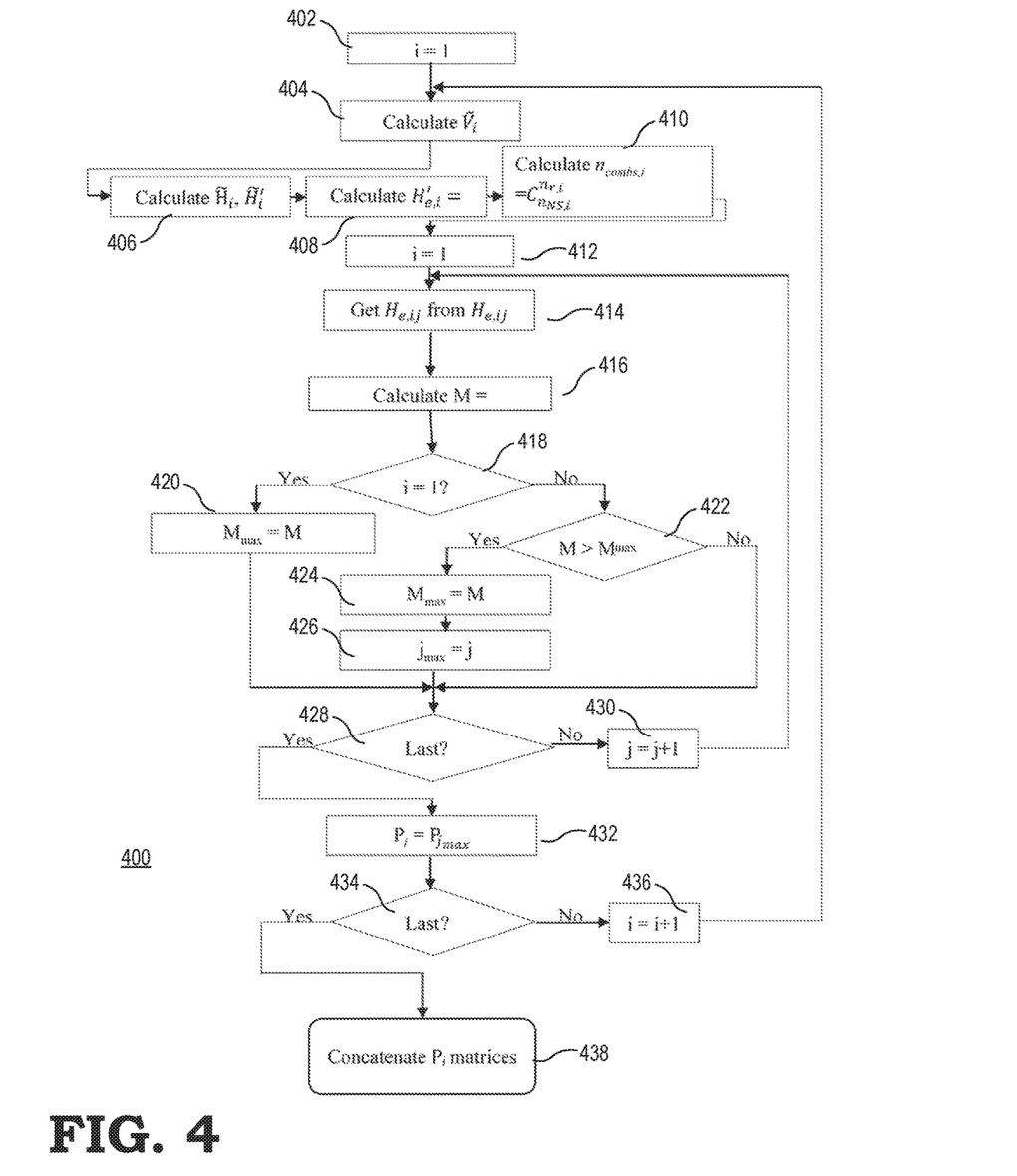
FIG. 4 is a flow diagram of a method of calculating quality scores for null space vectors in accordance with at least one embodiment.

FIG. 4 illustrates a flow diagram of an example of a method 400 for generating a precoding matrix based on quality scores of candidate precoding matrices in accordance with at least one embodiment. For purposes of description, the method 400 is described with respect to an example implementation at the data precode module 115 of FIG. 1. At block 402, the data precode module 115 sets a variable designated "i" to an initial value designating the first channel for the transmitter 102. For purposes of this example, the initial value is set to one. As set forth further below, the variables i and j are employed as indexes for generating different candidate precoding matrices. At block 404 the data precode module 115 generates the matrix $\tilde{V}_i$ as explained above. At block 406 the data precode module 115 calcluates the matrices $\tilde{H}_i$, $\tilde{H}_i'$ based on the channel matrix H, as explained above.

At block 408, the data precode module 115 multiplies the matrix $\tilde{V}_i$ and the matrix $\tilde{H}_i'$ to generate the matrix $H'_{e,i}$. At block 410 the data precode module 115 calculates the value $n_{combs,i}$ as explained above with respect to FIG. 1. At block 412, the data precode module 115 sets the value of the index variable j to an initial value of 1. At block 414, the data precode module 115 obtains the matrix $H_{e,ij}$. In at least one embodiment, $H_{e,ij}$ is obtained by selecting the j-th combination of column vectors out of $H'_{e,i}$, in similar fashion to the way $P_{i,j}$ is obtained by selecting the j-th combination of column vectors from $\tilde{V}_i$. A combination refers to a set of column vector indices. At block 416, the data precode module calculates the quality score M for the current values of i and j according to the formula set forth above.

At block 418, the data precode module 115 determines if the value for the variable j is 1. If so, the method flow moves to block 420 and the data precode module 115 sets the value for a variable $M_{max}$, used to store the maximum M value for the current channel, to the value of M calculated at block 416. The method flow proceeds to block 428, described below. Returning to block 418, if the value for the variable j is not one, the method flow moves to block 422 and the data precode module 115 determines if the value of M calculated at block 416 is greater than the current value of $M_{max}$. If not, the method flow moves to block 428, described below. If the value of M is greater than $M_{max}$ the method flow moves to block 424 and the data precode module 115 sets the value of $M_{max}$ to the current value for M. In addition, at block 426, the data precode module 115 sets the value of a variable $j_{max}$, indicating the index of the matrix associated with the highest quality score $M_{max}$, to the current value of the variable j.

The method flow proceeds to block 428, and the data precode module 115 determines if the quality score for the last candidate precoding vector for the current channel (as indicated by the variable i) has been calculated. If not, the method flow moves to block 430 and the data precode module 115 adds one to the value of the variable j. The method flow then returns to block 414. Returning to block 428, if the quality score for the last candidate precoding vector has been calculated, the method flow moves to block 432 and the data precode module 115 sets the value of $P_i$ to be equal to the value of the matrix $P_{jmax}$. That is, the data precode module 115 sets the value of the matrix $P_i$ to be equal to the candidate precoding vector having the highest quality score, as indicated by the variables $M_{max}$ and $j_{max}$.

The method flow moves to block 434 and the data precode module 115 determines if the value for the variable i corresponds to the last channel, such that all matrices $P_i$ have been identified. If not the method flow moves to block 436 and the data precode module 115 adds one to the value of the variable i. The method flow returns to block 404. Returning to block 434, if the value for the variable i corresponds to the last channel, the method flow moves to block 438 and the data precode module concatenates the Pi matrices identified at block 432, thereby forming the matrix $P_{BD}$ for precoding.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., readonly memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
for a first channel of a transmitter device including a plurality of channels to transmit data, generating a first precoding matrix at a processor of the transmitter device, the generating comprising:
for each of a plurality of candidate precoding matrices, calculating at the processor a corresponding quality score based on selected portions of a channel matrix associated with the plurality of channels;
selecting at the processor the first precoding matrix from the plurality of precoding matrices based on the calculated quality scores;
precoding at the processor, based on the first precoding matrix, first data for transmission via the first channel; and
transmitting, via one or more antennas of the transmitter device, the first precoded data via the first channel at the transmitter device.

2. The method of claim 1, wherein each of the plurality of candidate precoding matrices corresponds to a different portion of a null space of the complement of the channel matrix.

3. The method of claim 1, wherein calculating the corresponding quality score comprises calculating at the processor a first quality score for the first precoding matrix based on a corresponding portion of the channel matrix and based on a transposition and complex conjugation of the corresponding portion of the channel matrix.

4. The method of claim 3, wherein the corresponding quality score is generated based on the matrix $\tilde{H}_i$, and further comprising:
generating $\tilde{H}_i$ at the processor by eliminating the rows out of the channel matrix H.

5. The method of claim 4, wherein the corresponding quality score is generated at the processor based on the matrix $\tilde{V}_i$, and further comprising:
generating $\tilde{V}_i$ from the null-space of the $\tilde{H}_i$ matrix.

6. The method of claim 5, wherein the corresponding quality score is generated based on matrices $P_{i,j}$, wherein i corresponds to a transmitter channel and j identifies a vector combination of the $\tilde{V}_i$ matrix, such that each of the matrices $P_{ij}$ corresponds to a different vector combination of the $\tilde{V}_i$ matrix.

7. The method of claim 6, wherein the corresponding quality score is generated based on the matrix $H_{e,ij}=\tilde{H}_i'P_{i,j}$, and wherein, $\tilde{H}_i'$ corresponds to rows of the channel matrix that correspond to the i-th channel of the plurality of channels.

8. The method of claim 7, wherein the corresponding quality score is generated based on the matrix $H_{e,ij}=\tilde{H}_i'P_{i,j}$.

9. The method of claim 8, wherein the corresponding quality score is generated according to the formula:

$$M_{ij}=det(H_{e,ij}{}^H H_{e,ij})$$

where $M_{ij}$ corresponds to the quality score.

10. A method of precoding data at a multi-user multiple-input multiple-output transmitter device configured to communicate with a plurality of receivers via a communication medium, comprising:
for each of a plurality of candidate precoding matrices, calculating at a processor of the transmitter device a corresponding quality score based on selected portions of a channel matrix associated with the communication medium;
selecting at the processor device a precoding matrix from the plurality of precoding matrices based on the calculated quality scores;
precoding at the processor device, based on the selected precoding matrix, data for transmission; and
transmitting, via one or more antennas of the transmitter device, the precoded data via the first channel.

11. The method of claim 10, wherein calculating the corresponding quality score comprises calculating a quality score for the selected precoding matrix based on a corresponding portion of the channel matrix and based on a transposition and complex conjugation of the corresponding portion of the channel matrix.

12. A transmitter device comprising:
a plurality of channels including a first channel;
a precoding vector module configured to generate a first precoding matrix for the first channel by:
for each of a plurality of candidate precoding matrices, calculating a corresponding quality score based on selected portions of a channel matrix associated with the plurality of channels;
selecting the first precoding matrix from the plurality of precoding matrices based on the calculated quality scores;
a precoding matrix applicator configured to precode, based on the first precoding matrix, first data for transmission via the first channel, wherein the transmitter device is configured to transmit the first precoded data via the first channel.

13. The transmitter device of claim 12, wherein each of the plurality of candidate precoding matrices corresponds to a different portion of a null space of the complement of the channel matrix.

14. The transmitter device of claim 13, wherein calculating the corresponding quality score comprises calculating a first quality score for the first precoding matrix based on a corresponding portion of the channel matrix and based on a transposition and complex conjugation of the corresponding portion of the channel matrix.

15. The transmitter device of claim 14, wherein the precoding vector module generates the corresponding quality score based on the matrix $\tilde{H}_i$, and generates $\tilde{H}_i$ by eliminating the rows out of the channel matrix H.

16. The transmitter device of claim 15, wherein the precoding vector module generates the quality score based on the matrix $\hat{V}_i$, and generates $\hat{V}_i$ from the null-space of the $\tilde{H}_i$ matrix.

17. The transmitter device of claim 15, wherein the precoding vector module generates the corresponding quality score is based on matrices $Pi_{,j}$, wherein i corresponds to a transmitter channel and j identifies a vector combination of the $\hat{V}_i$ matrix, such that each of the matrices $P_{ij}$ corresponds to a different vector combination of the $\hat{V}_i$ matrix.

18. The transmitter device of claim 17, wherein the precoding vector module generates the corresponding quality score based on the matrix $H_{e,ij}=\tilde{H}_i'P_{i,j}$, and wherein, $\tilde{H}_i'$ corresponds to rows of the channel matrix that correspond to the i-th channel of the plurality of channels.

19. The transmitter device of claim 18, wherein the precoding vector module generates corresponding quality score based on the matrix $H_{e,ij}=\tilde{H}_i'P_{i,j}$.

20. The transmitter device of claim 19, wherein the precoding vector module generates the corresponding quality score according to the formula:

$$M_{ij}=det(H_{e,ij}{}^H H_{e,ij})$$

where $M_{ij}$ corresponds to the quality score.

* * * * *